United States Patent [19]

Shindley

[11] Patent Number: 4,568,883
[45] Date of Patent: Feb. 4, 1986

[54] FREQUENCY-SHIFT-KEYED DATA DETECTOR

[75] Inventor: Richard P. Shindley, Marion, Iowa

[73] Assignee: Rockwell International Corporation, El Segundo, Calif.

[21] Appl. No.: 592,634

[22] Filed: Mar. 23, 1984

[51] Int. Cl.$^4$ .............................................. H03D 3/04
[52] U.S. Cl. .................................. 329/126; 329/110; 375/88; 375/94
[58] Field of Search ................. 329/110, 126; 375/45, 375/46, 47, 48, 49, 51, 80, 82, 83, 88, 90, 94

[56] References Cited

U.S. PATENT DOCUMENTS 3,257,508  6/1966  Crafts et al. .................... 329/110

Primary Examiner—Eugene R. LaRoche
Assistant Examiner—James C. Lee
Attorney, Agent, or Firm—George A. Montanye; H. Fredrick Hamann

[57] ABSTRACT

There is disclosed an apparatus and technique for recovering frequency-shift-keyed (FSK) data from a conventional FM detector while allowing the system to operate over wide temperature ranges without FM detector temperature compensation. The FSK input signal is coupled through a bandpass filter and differentiated to provide positive and negative voltage spikes. The voltage spikes are compared with positive and negative reference levels to produce set and reset inputs to a set/reset flip-flop. The output from the flip-flop is a reconstruction of the FSK data which is not affected by temperature-related DC offsets and detector drift.

4 Claims, 2 Drawing Figures

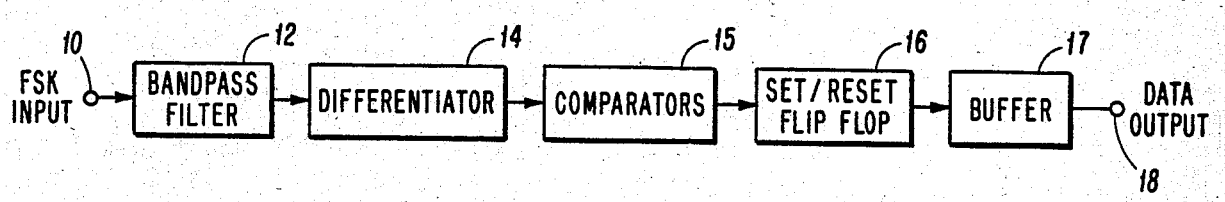
FIG 1
FIG 2
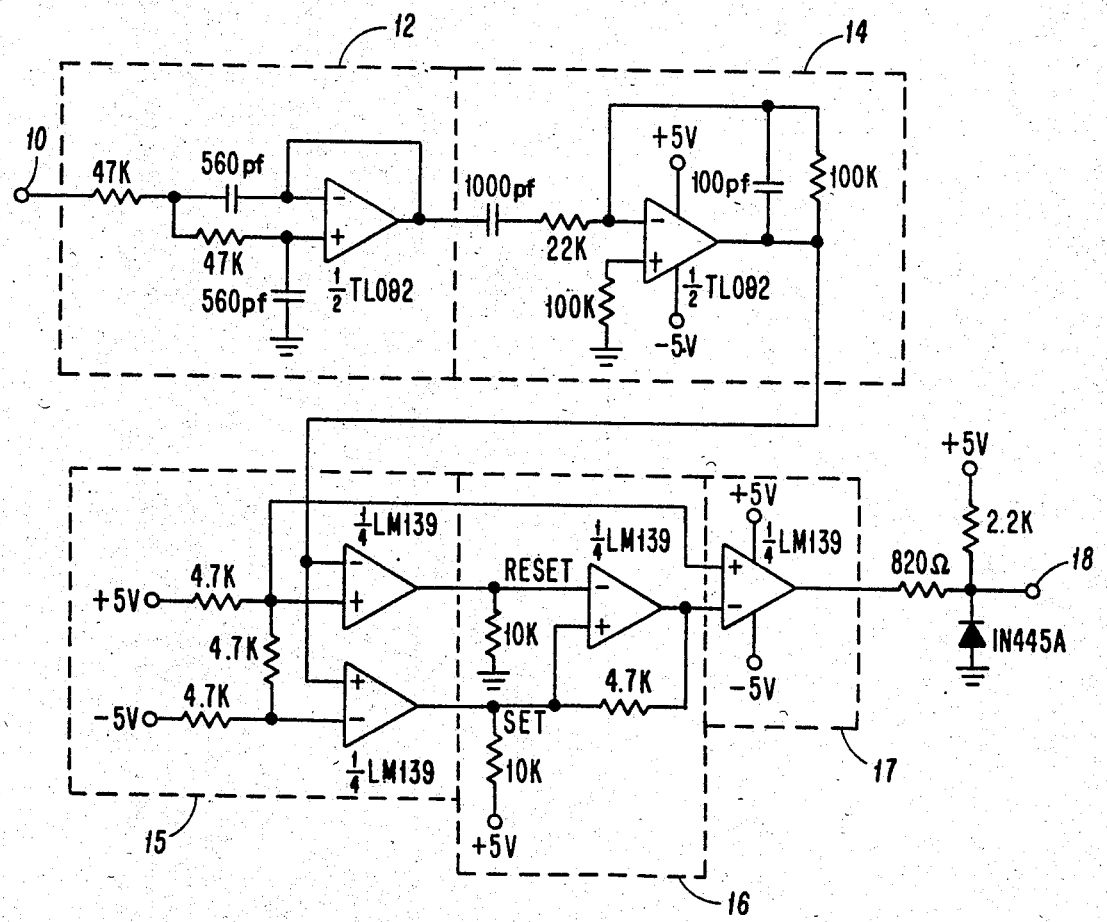

FREQUENCY-SHIFT-KEYED DATA DETECTOR

BACKGROUND OF THE INVENTION

The present invention relates to frequency modulated radio receivers and detectors, and more particularly, to a system and technique for recovering data from FM detectors.

Conventional FM detectors include structure to sense a frequency modulated carrier waveform and convert that frequency modulation into a voltage output representing the modulation. Such detectors are known to be temperature sensitive which produce temperature drift of the detector and temperature-related DC offsets during operation. While such characteristics are not particularly critical and may be tolerated in voice communication transmissions, they can produce unacceptable results when the FM detectors are used in connection with the transmission of FSK data.

In particular, when FSK data is transmitted and detected through a conventional FM detector, detector drift due to temperature variations may produce inaccuracies over time which affect the integrity of the data. This is especially true for those outputs from FM detectors which are capacitively coupled and include an extended series of signals representing digital 1's and 0's which can cause capacitor bleed. While this might be overcome by the use of a larger capacitance, the same would reduce response time to DC level changes representing data transmission. This is not acceptable in situations when an off-frequency, in-band, carrier creates a DC offset that must be eliminated instantaneously when valid data is received.

There is, therefore, a continuing need for providing circuits which may be used in connection with conventional FM detectors to improve their response when transmitting data and particularly to enable reliable recovery of FSK data. Accordingly, the present invention has been developed to overcome the limitations of the above-known and similar techniques, and to provide an improved data detector.

SUMMARY OF THE INVENTION

In accordance with the present invention, FSK data from a conventional FM detector is AC coupled through a bandpass filter to a differentiator which is constructed to detect only the frequency changes. The bandpass filter improves the weak signal performance of the differentiator by reducing the high-frequency content of the detected signal. The output of the differentiator produces a series of voltage spikes which are in the form of brief positive and negative spikes. The voltage spikes are coupled to a comparator circuit where the positive and negative spikes are respectively compared with positive and negative reference levels. When the spikes exceed the threshold set by the reference levels, an output from the comparator is provided and the outputs from the respective comparators are coupled to a set/reset flip-flop. The output from the positive spike comparator sets the set/reset flip-flop while the output from the negative spike comparator resets the set/reset flip-flop. The output from the flip-flop is coupled through a buffer to then provide a reconstruction of the original FSK data unaffected by any voltage drift or DC voltage offset contribution from the FM detector.

It is therefore a feature of the invention to provide a circuit and technique for improving the recovery of data.

Still another feature of the invention is to provide a circuit and technique for recovering FSK data.

Yet another feature of the invention is to provide an improved technique and circuit for recovering FSK data from conventional FM detectors.

Yet another feature of the invention is to provide a detector circuit and technique for recovering data from FM detectors over wide temperature extremes without temperature compensation of the FM detector.

Still a further feature of the invention is to provide a data detector circuit and technique which enables a reconstructed output of FSK data without DC offset and drift related effects.

Still another feature of the invention is to provide a detector for improving radio receiver sensitivity and performance in the presence of off-frequency, in-passband, carriers.

These and other objects, advantages, and novel features of the invention will become apparent from the following detailed description when considered with the accompanying drawings wherein:

BRIEF DESCRIPTION OF THE DRAWINGS

FIG. 1 is a schematic block diagram showing the detector circuit of the present invention.

FIG. 2 is a detailed schematic diagram showing the individual components forming the detector circuit of FIG. 1.

DETAILED DESCRIPTION OF A PREFERRED EMBODIMENT

Referring now to the drawings, there is shown a data detector circuit for use in connection with data transmission from conventional FM detectors wherein like numerals are used to refer to like elements throughout. In particular, there is shown in FIG. 1 a broad schematic diagram illustrating the data detector circuit in accordance with the present invention. In this example, the circuit is shown in connection with the receipt of frequency-shift-keyed (FSK) data from the output of a conventional FM detector, but it will be apparent that the same is applicable to the receipt of any other data having similar characteristics and problems produced by FM detector drift and related DC offsets.

Referring first to FIG. 1, the FSK data input from an FM detector is provided to terminal 10 and coupled to a bandpass filter 12, which in the present instance may be a 6 kHz bandpass filter. The output from filter 12 is coupled to a differentiator 14 which operates on the filtered FSK input to detect only the frequency changes from the FM detector. The bandpass filter is employed to reduce high frequency components of the detected signal to improve weak signal performance of the differentiator. The differentiator thus provides an output in the form of brief positive and negative voltage spikes caused by the change in frequency, and reflecting the FSK data. These voltage spikes are in turn coupled to comparators 15 which compare the voltage spikes with known positive and negative reference levels to produce a threshold comparison and an output in response to voltage spikes of a given amplitude.

The output from the comparators 15 is thus a series of alternating voltage levels of a predetermined magnitude created by the positive and negative voltage spikes representing a change in frequency and thereby reflecting the FSK data input at the terminal 10. The outputs from the comparators 15 are in turn coupled to a set/reset flip-flop 16 wherein the positive voltage spike is coupled to drive the set input of the flip-flop 16, and the negative voltage spike is coupled to drive the reset input of the flip-flop 16. As a result, the output of the flip-flop 16 represents a reconstruction of the original FSK data provided as input to the terminal 10 in the form of a digital 1 or 0 depending on the voltage output level of the flip-flop 16. This output from the flip-flop 16 is then coupled through a buffer circuit 17 which inverts the data output from the flip-flop 16 in a conventional manner to provide an output 18 representing a reconstruction of the original data.

Because the original FSK data is differentiated to detect only the frequency changes, any DC offset from the FM detector as may be created by temperature-related effects or temperature drift of the FM detector will be eliminated and the signal will only contain the digital 1's or 0's representing the FSK data. Also, the same construction and operability will allow the data output from 18 to accurately reflect changes in the data level even in the presence of off-frequency, in-band, carriers which create a DC offset that must be eliminated when the data is received. Accordingly, the output from 18 is not affected by any of the above, regardless of how long the digital 1's or 0's must be provided at the output 18, and regardless of the frequency changes that must occur to reflect the FSK data input at 10.

Turning now to FIG. 2, there is shown a detailed schematic diagram of structure that may be used to implement the detector circuit shown in FIG. 1. In particular, the bandpass filter 12 may be constructed from one-half of a TL-082 integrated circuit including an operational amplifier configured to form a 6 kHz bandpass filter by coupling of the operational amplifier in the manner shown in FIG. 2. In this instance, for FSK input data having a 3 volt peak-to-peak value, the given values for the components in terms of resistance and capacitance are that as specified in FIG. 2 in connection with each of the components forming the described circuit. The output from the 6 kHz bandpass filter is coupled through a 1000 pf capacitor as input to the differentiator 14 also formed by one-half of a TL-082 integrated circuit. Again, an operational amplifier is specifically coupled to act as a differentiator with the individual resistances and capacitances fixed at the values shown in the drawing in connection with differentiator 14. The output from the differentiator 14 is in turn coupled to a comparator stage 15 which includes two comparators, each formed from one-quarter of an LM139 integrated circuit. DC reference levels of ±5 V are coupled to positive and negative inputs of the comparators forming the comparator stage 15. The output from the differentiator 14 is then coupled to the other input of each of the two comparators. The outputs from the comparator stage 15 are voltage levels which reflect the positive and negative voltage spikes produced by the differentiator 14 in response to frequency changes in the FSK input data at 10.

The outputs from the comparator stage 15 are provided to the set/reset flip-flop 16 which is also formed by one-quarter of an LM139 integrated circuit. As can be seen, the output from the comparator of comparator stage 15 which reflects the positive voltage spike from the differentiator 14 is coupled to the set input of the set/reset flip-flop 16 while the output from the comparator of comparator stage 15 representing the negative voltage spike is coupled to the reset input of the flip-flop 16. This produces an output from the flip-flop which reflects the logic 0 and 1 data which follows the FSK input. This in turn is coupled to an inverting buffer 17 to provide an output 18 which is an accurate reconstruction of the data input at terminal 10. The buffer 17 is similarly constructed from one-quarter of an LM139 integrated circuit forming a comparator which includes one input from the set/reset flip-flop 16 and one input from the positive terminal of the negative spike comparator of the comparator stage 15 (positive voltage reference). The output from the buffer 17 is coupled through a resistor to the junction of a resistor and diode to provide a TTL signal level compatible output 18 in the manner shown in FIG. 2.

As will be appreciated, the above system can be used in connection with the output from a conventional FM detector and particularly with FM detectors normally directly (DC) connected to conventional comparator data detector circuits. In such instances, there are temperature related DC offsets and temperature related drifts of the detector which normally affect the output when the detector is used to transmit data instead of voice. This detector circuit accordingly provides a technique which responds only to frequency changes to reconstruct the original data in an output and does not respond to or reflect the DC voltage offsets or temperature related problems of the particular FM detector used. The circuit is particularly useful in improving receiver sensitivity and providing improved performance of a receiver using a series capacitor in the detector output when in the presence of an off-frequency but in-passband carrier which would normally produce a DC offset that could charge the series capacitor and thereby result in data errors at the comparators when valid data signals are received. Accordingly, the present invention allows a reliable reconstruction of an extended series of digital 1's and 0's in the data without a need for temperature compensation of the FM detector. These are all features which are not taught or suggested in the prior art.

Obviously, many other modifications and variations of the invention are possible in light of the above teachings. By way of example, the set/reset flip-flop specifically illustrated in FIG. 2, could be implemented with any conventional set/reset flip-flop construction. It is therefore to be understood that within the scope of the appended claims, the invention may be practiced otherwise than as specifically described.

What is claimed is:

1. A data detector circuit comprising:
    means for receiving an input signal representing input data wherein the data is represented by frequency changes;
    means for differentiating said input signal to produce positive and negative voltage spikes representing said frequency changes; and
    means responsive to said positive and negative voltage spikes for providing a reconstructed output of said input data, said means for providing a reconstructed output comprising;
        a first comparator coupled to compare said positive voltage spikes with a positive reference level,
        a second comparator coupled to compare said negative voltage spikes with a negative reference level, each of said first and second comparators providing an output representing said positive and negative voltage spikes, and a set/reset flip-flop having a set input, a reset input and an output, said set input coupled to receive the output of said comparator representing the positive voltage spikes and said reset input being coupled to receive the output of the comparator representing the negative voltage spikes, said flip-flop output representing said reconstructed data.

2. The detector of claim 1 further including means for bandpass filtering said input signal.

3. A frequency-shift-keyed data detector comprising:

an input coupled to receive frequency-shift-keyed data;

a bandpass filter coupled to said input to receive and filter said frequency-shift-keyed data and provide an output;

a differentiator responsive to the output of said bandpass filter for differentiating said filtered frequency-shift-keyed data and providing positive and negative voltage spikes in response to frequency changes of said frequency-shift-keyed data;

a first comparator coupled to receive the positive voltage spikes from said differentiator for comparing said positive voltage spikes with a first reference level and providing an output when said positive voltage spikes exceed that first reference level;

a second comparator coupled to receive the negative voltage spikes from said differentiator for comparing said negative voltage spikes with a second reference level and providing a second output when said negative voltage spikes exceed said second referece level; and a set/reset flip-flop having a set input, reset input, and an output, said set input being coupled to the output of said first comparator and said reset input being coupled to the output of said second comparator, said output of said set/reset flip-flop representing a reconstruction of the FSK data input.

4. In a frequency-shift-keyed data detector system including a conventional FM detector providing an output of FSK data, the improvement comprising:

means for receiving the frequency-shift-keyed data from said FM detector;

a bandpass filter coupled to receive and filter said frequency-shift-keyed data and provide an output;

a differentiator responsive to the output of said bandpass filter for differentiating said filtered frequency-shift-keyed data and providing positive and negative voltage spikes in response to frequency changes of said frequency-shift-keyed data;

a first comparator coupled to receive the positive voltage spikes from said differentiator for comparing said positive voltage spikes with a first reference level and providing an output when said positive voltage spikes exceed that first reference level;

a second comparator coupled to receive the negative voltage spikes from said differentiator for comparing said negative voltage spikes with a second reference level and providing a second output when said negative voltage spikes exceed said second referece level; and a set/reset flip-flop having a set input, reset input, and an output, said set input being coupled to the output of said first comparator and said reset input being coupled to the output of said second comparator, said output of said set/reset flip-flop representing a reconstruction of the FSK data input.

* * * * *